(12) United States Patent
Morales et al.

(10) Patent No.: US 12,159,075 B1
(45) Date of Patent: Dec. 3, 2024

(54) MANAGEMENT OF HOT FOLDERS DURING PRINTING OPERATIONS

(71) Applicant: Kyocera Document Solutions Inc., Osaka (JP)

(72) Inventors: Javier A. Morales, Rochester, NY (US); Yoshihiro Osada, Torrance, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 18/370,061

(22) Filed: Sep. 19, 2023

(51) Int. Cl.
*G06F 3/12* (2006.01)

(52) U.S. Cl.
CPC ............ *G06F 3/127* (2013.01); *G06F 3/1204* (2013.01); *G06F 3/1222* (2013.01); *G06F 3/1238* (2013.01); *G06F 3/1274* (2013.01)

(58) Field of Classification Search
CPC ...... G06F 3/127; G06F 3/1204; G06F 3/1222; G06F 3/1238; G06F 3/1274
USPC ....................................................... 358/1.15
See application file for complete search history.

(56) References Cited

U.S. PATENT DOCUMENTS

| | | | |
|---|---|---|---|
| 11,079,993 B2 | 8/2021 | Kubota | |
| 2007/0165275 A1* | 7/2007 | Iizuka | G06F 3/1255 358/1.15 |
| 2009/0273799 A1* | 11/2009 | Hanawa | G06F 3/1285 358/1.9 |
| 2010/0179965 A1* | 7/2010 | Koshigaya | G06F 21/608 707/783 |
| 2012/0162708 A1* | 6/2012 | Hagiwara | G06F 3/1208 358/1.15 |
| 2012/0224221 A1* | 9/2012 | Mochizuki | G06F 3/1261 358/1.15 |
| 2012/0327437 A1* | 12/2012 | Hanawa | G06F 3/1285 358/1.9 |
| 2015/0235111 A1* | 8/2015 | Hosomi | G06K 15/181 358/1.15 |
| 2015/0261490 A1* | 9/2015 | Fujieda | G06F 3/1253 358/1.15 |
| 2015/0288762 A1* | 10/2015 | Ito | G06F 16/00 709/213 |
| 2016/0259606 A1* | 9/2016 | Aoki | G06F 3/1247 |
| 2017/0206353 A1* | 7/2017 | Jai | G06F 21/565 |
| 2019/0163458 A1* | 5/2019 | Goodridge | G06F 21/335 |
| 2023/0084018 A1* | 3/2023 | Tonouchi | G06F 3/1224 358/1.14 |

* cited by examiner

*Primary Examiner* — Negussie Worku
(74) *Attorney, Agent, or Firm* — Millen, White, Zelano & Branigan P.C.; William F. Nixon

(57) ABSTRACT

Printing operations may use a hot folder. The hot folder includes printing instructions that are applied to print jobs within the hot folder. A file for the print job is stored in the hot folder. More than one file can be retained. Modifications to the file are made while it is within the hot folder, if allowed. Once processing of the file for printing operations is complete, the file is removed from the hot folder.

18 Claims, 6 Drawing Sheets

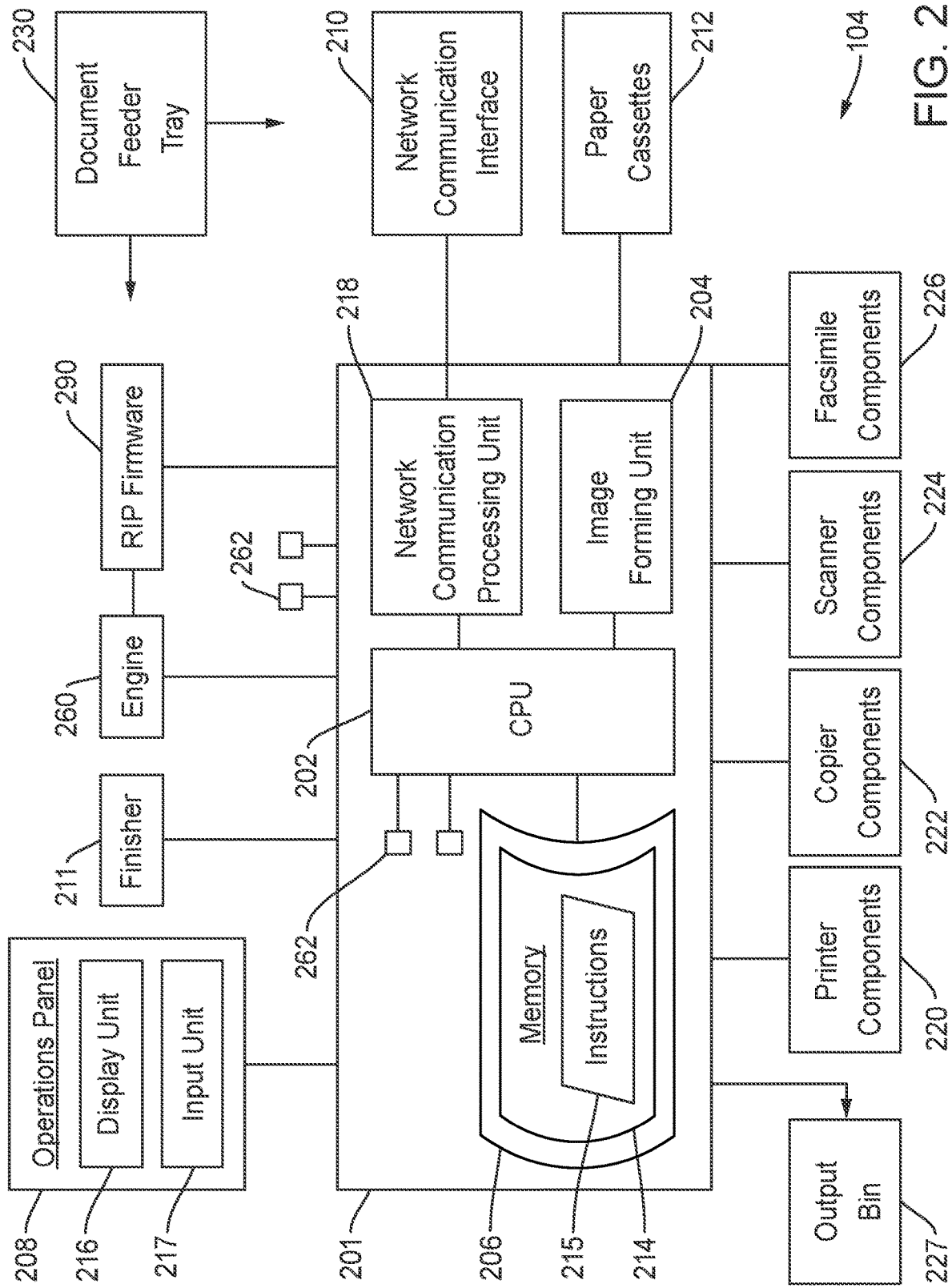

MANAGEMENT OF HOT FOLDERS DURING PRINTING OPERATIONS

FIELD OF THE INVENTION

The present invention relates to managing hot folders during printing operations to enable access to submitted files.

DESCRIPTION OF THE RELATED ART

Hot folders may be a common way to connect software applications in production printing environments. Hot folders may be used for a single file submission but there are cases in which hot folders are used to process multiple files. For example, this action may be performed when submitting print tickets and page description language (PDL) files as separate files. Alternatively, this action also may be done when collecting files to submit as a job group. This sort of processing requires that the files remain in the hot folder for a potentially extended period of time. The processing, in turn, creates opportunity for clients using the hot folder to cause problems by deleting or modifying files being held in the hot folder.

SUMMARY OF THE INVENTION

A method for performing printing operations is disclosed. The method includes receiving, at a hot folder associated with a printing device, a file for a print job to be printed at the printing device. The method also includes processing the print job at a digital front end (DFE) of the printing device. The method also includes retaining the file for the print job in the hot folder during the processing. The method also includes determining that the processing is complete. The method also includes removing the file for the print job from the hot folder.

A method for performing printing operations is disclosed. The method includes receiving, at a hot folder associated with a printing device, a file for a print job to be printed at the printing device. The method also includes accessing the file for the print job in the hot folder. The method also includes determining whether the file for the print job is available. The method also includes opening the file for the print job stored in the hot folder. The method also includes modifying the file for the print job using an application. The method also includes saving the modified file for the print job within the hot folder when the application is closed.

A printing system is disclosed. The printing system includes a printing device having a digital front end (DFE). The printing system also includes a storage device accessible by the DFE. The storage device includes a processor and a memory connected to the processor. The memory stores instructions that, when executed on the processor, configures the storage device to receive, at a hot folder associated with the printing device, a file for a print job to be printed at the printing device. The storage device also is configured to process the print job at the DFE of the printing device. The storage device also is configured to retain the file for the print job in the hot folder during the processing. The storage device also is configured to determine that the processing time is complete. The storage device also is configured to remove the file for the print job from the hot folder.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

FIG. 2 illustrates a block diagram of components of the printing device for use within the printing system according to the disclosed embodiments.

DETAILED DESCRIPTION OF THE PREFERRED EMBODIMENTS

Figure 1A:
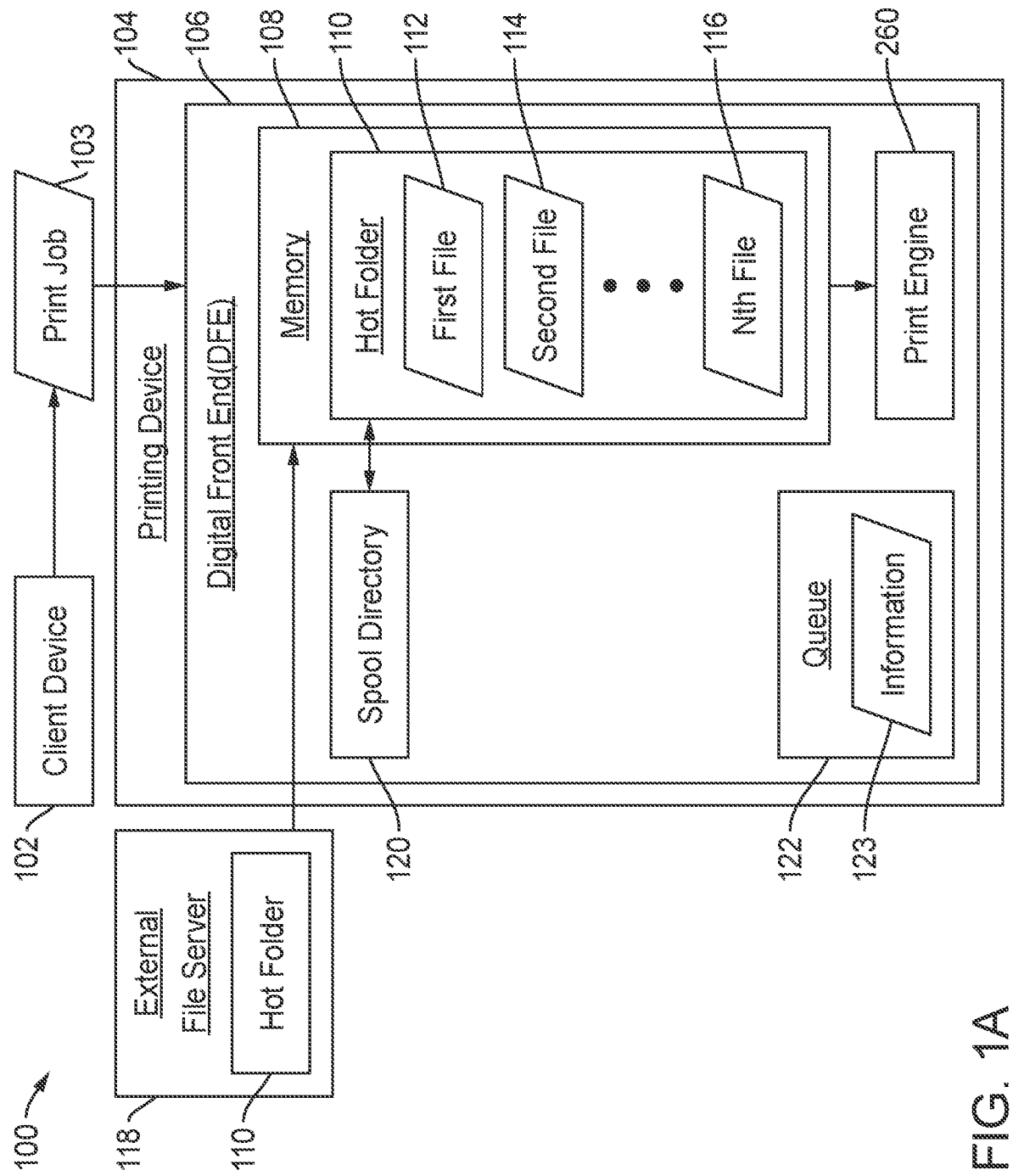
FIG. 1A illustrates a printing system having a printing device for printing documents using a hot folder according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide enhancements to hot folder job processing in order to enable operators and third party clients direct access to submitted files throughout the job processing lifecycle at the printing device. In addition, the disclosed embodiments provide hot folder enhancements that enable more sophisticated job processing in systems with limited resources. The disclosed embodiments increase the functionality available to printing systems incorporating hot folders.

The hot folder may serve as the spool directory for jobs. Instead of moving jobs to a hidden location, the printing system may retain them in the hot folder until they complete processing. The printing system also may store additional job files with the job in the hot folder. For example, print tickets that result from print ticket blending, job costing data, and the like may be stored with the job in the hot folder.

The disclosed embodiments retain the jobs in the hot folder until they complete processing. Once the job completes processing, it will be removed from the hot folder. This feature may enable clients to monitor and interact with the files in the hot folder directly, which simplifies integration. Instead of writing software against an API, the client can monitor the hot folder, which commonly available functionality in production printing applications, and take actions based on the content of the hot folder.

The hot folder will implement additional enhancements in order to protect the integrity of the printing system. These enhancements may be implemented for the purposes of enabling use of the hot folder as the spool folder. These enhancements also may be implemented in order to ensure the integrity of the printing system in other cases that require files to reside in the hot folder for an extended period of time. When files are received, the disclosed embodiments may adjust privileges on the files in order to prevent modification of the files. Privileges may be adjusted to prevent any modification to the file. Alternatively, privileges may be adjusted so that only the original submitter has the ability to modify the file. Most hot folder systems can capture the credentials of the submitter providing a file to a hot folder.

In some embodiments, the printing system may simply monitor the status of the file and perform one of several options if the file is modified or replaced. If the job has not started processing, then the printing system may hold the job so that it does not process until the file modification is completed or until the replacement file is finished copying. Once the above operations are completed, the disclosed embodiments would resume the job using the updated or new files as the PDL file.

If the job has started processing but not yet printing, then the printing system would suspend the job per above. The printing system, however, additionally would perform the following actions. It would discard any rendered data for the job. It also would restart processing from the start of the job using the updated or new PDL file. If the job has started printing, then the printing system may, instead, choose to abort the job as the user will need to determine whether to reprint the job in its entirety or whether to reprint the remaining part of the job using the updated or new PDL file.

Printing systems with few resources may be configured to use a hot folder located in an external file server. This feature would allow the printing system to hold an essentially unlimited number of spool files. The printing system would track the jobs in the external hot folder on a queue with minimal information in order to hold many jobs. Alternatively, the printing system may add a subset of the jobs in the external hot folder to its queue, such as one in the DFE of the printing device. The protections disclosed above still applies to the external hot folders. The printing system would transfer only the active job to the DFE of the printing device for rendering. For printing systems with very limited storage, the disclosed embodiments may split the job into individual pages in the hot folder and then transfer a limited number of pages into the DFE of the printing device.

Because the spool folder of the DFE remains accessible to third party clients, the printing system would have the ability to enable the sophisticated job manipulation or processing that is typically available in server DFEs. For example, a server DFE may give the operator the ability to open PDFs in an application for preflight or editing. This functionality is not available in an embedded controller because it typically requires a local copy of the third party preflight or editing software. Because the spool folder remains accessible to third party application, however, the files located there may be opened by these applications to provide sophisticated job manipulation for systems with limited functionality.

If the printing system is using the protection functionality disclosed herein, then the printing system may provide an user interface option that will both temporarily lose the integrity protections and open the file in the external application. This feature also may be extended to integrations with third party production print products that support hot folders. For example, the embedded controller may move the file from its hot folder into the hot folder of an application that can perform sophisticated imposition that is not available in embedded controllers. This action may be done via a trigger in the user interface for the printing system. When the operator selects one of these options, the printing system may move the file to the third party client and then replace the spool file with the output from the external process. This feature would enable very sophisticated workflows that are still controlled from the user interface to the DFE or embedded controller.

FIG. 1A depicts a printing system 100 for printing documents using a hot folder 110 according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Printing device 104 may receive print job 103 as it is processing and printing current print jobs. Current jobs may use different paper or media than print job 103. As such, printing device 104 may include a plurality of paper trays to supply papers of various types, sizes, weights, and the like.

As print jobs are received, DFE 106 may process the print jobs and store jobs waiting to be printed. Embodiments of DFE 106 are disclosed in greater detail below by FIG. 1B. In addition to the features disclosed in FIG. 1B, DFE 106 also may include memory 108. Memory 108 may store files that being processed for delivery to print engine 260 for printing. Preferably, the files may be stored in a hot folder 110. DFE 106 may utilize functionality to allow operators to utilize hot folder 110. Memory 108 may store one or more hot folders 110 to allow operators to print by saving print jobs to a hot folder 110 over printing system 100.

Hot folder 110 may have an associated set of print instructions, such as print quantity, media, and finishing, such that when a particular print job is saved to the hot folder, that hot folder's associated print instructions will be used when providing the processed file for the print job to print engine 260. Some file types, such as postscript files and some other Page Description Language (PDL) file types, allow an operator to specify comprehensive print instructions, including print quantity, print media, and print finishing, via embedded print ticketing. Operators may not know how a print job should be set up, in order to include the print instructions. Thus, some operators may, instead, save files to hot folders, in order to apply predefined print instructions.

In order to provide flexibility in print instructions for multiple jobs, many hot folders 110 may be created. Thus, memory 108 may include more than one hot folder 110. Each hot folder may specify one or more different print quantities, print media, print finishing, and the like. Hot folder 110 includes files for the received print jobs within DFE 106. Some hot folders may be used for single file submission, but other hot folders are used to process multiple files. Thus, hot folder 110 includes first file 112, second file 114, up to Nth file 116. Nth file 116 may represent the latest file placed in hot folder 110. Other files may be included between second file 114 and Nth file 116. These files are provided to print engine 260 for printing within printing device 104.

Hot folder 110 also may serve as a spool directory 102 within DFE 106, such as for RIP firmware 290. Instead of moving files to a hidden location, DFE 106 may retain them in hot folder 110 until they complete processing within the DFE. Thus, files for the print jobs will be retain in hot folder 110. Once the job completes processing, the file will be removed from hot folder 110. This feature will allow operators to monitor and interact with the files in hot folder 110 directly, which simplifies integration. For example, an operator may access second file 114 to interact with the file while its print job is processing. These features are disclosed in greater detail below. Once second file 114 is done processing, it is removed from hot folder 110 and provided to print engine 260 along with the print instructions of the hot folder.

In some embodiments, DFE 106 may have limited resources in order to store and process files for print jobs. Printing system 110 may be configured to include an external file server 118 that supports hot folder 110. Instead of being within memory 108 of DFE 106, hot folder 110 is located at external file server 118, where it may take advantage of additional memory storage. First file 112, second file 114, up to Nth file 116 may be within hot folder 110 at external file server 118, but not shown in FIG. 1A. This embodiment may allow printing system 100 to store an unlimited number of spool files.

Printing system 100 or DFE 106 may track the files in an external hot folder 110 on a queue 122 with minimal information 123. Alternatively, DFE 106 may add a subset of the files in external hot folder 110 to queue 122. In some embodiments, DFE 106 may only transfer an active job to its memory 108 for rendering by RIP firmware 290. For DFEs with limited storage, the disclosed embodiments may split the print job into individual pages in hot folder 110 then transfer a limited number of pages to memory 108. External file server 118 also may enable to ability to manipulate or process jobs in a sophisticated way that may be only available to server DFEs.

Figure 1B:
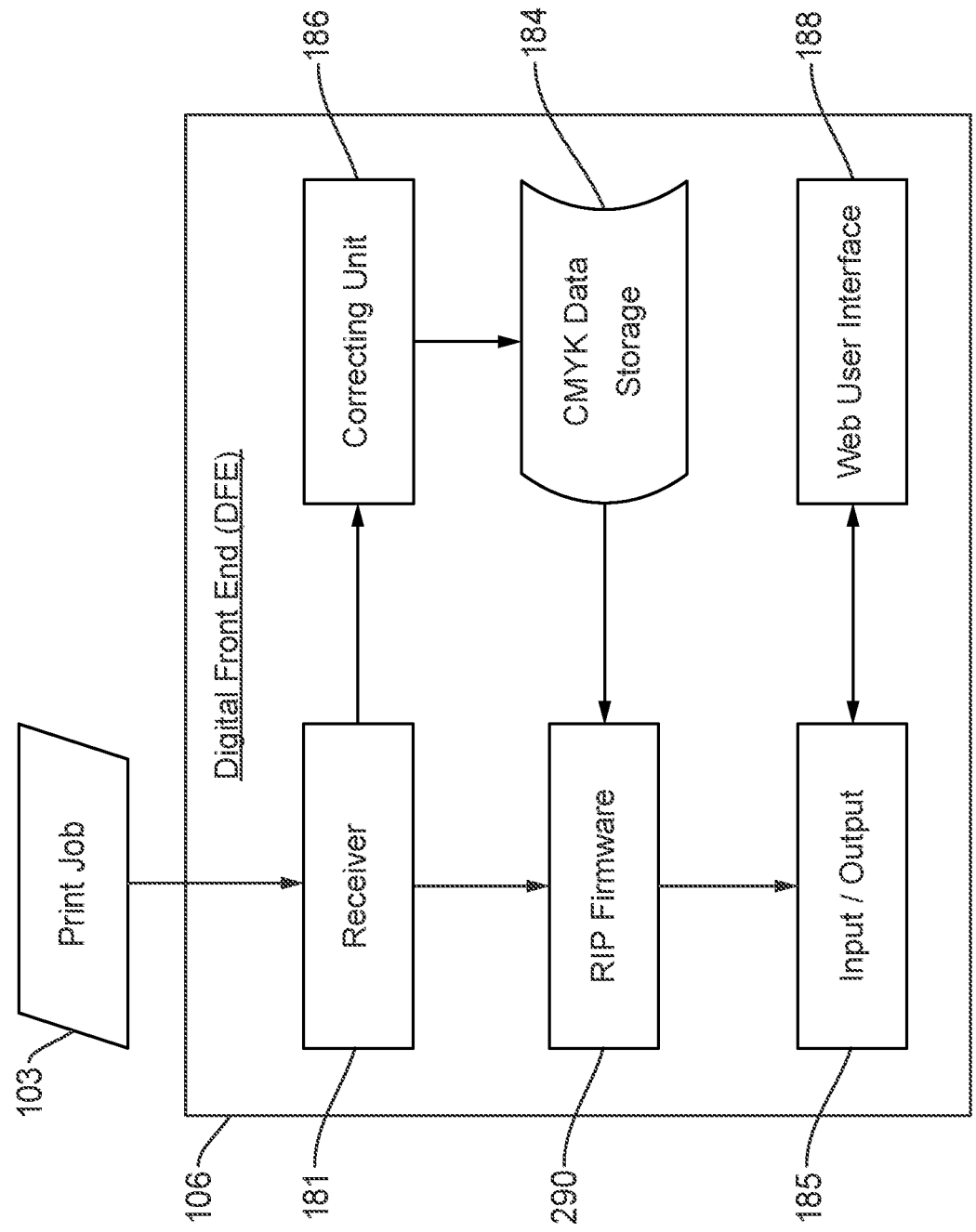
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed in FIG. 1A.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
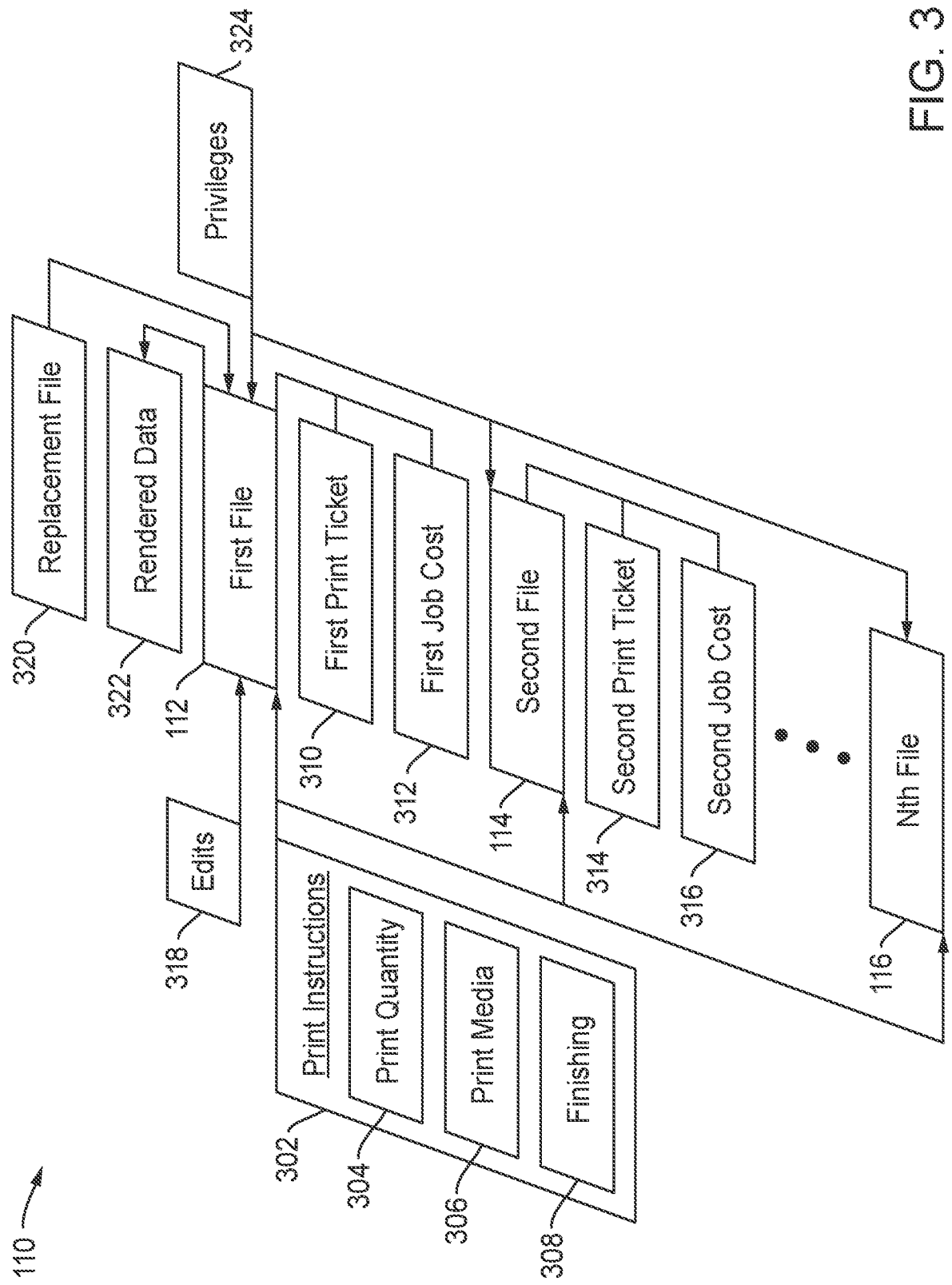
FIG. 3 illustrates a block diagram of the hot folder having a plurality of files according to the disclosed embodiments.

FIG. 3 depicts a block diagram of hot folder 110 having a plurality of files according to the disclosed embodiments. As noted above, hot folder 110 may be one of several hot folders stored in memory 108 of DFE 106. The hot folders may server as spool directories within DFE 106. As such, files for print jobs may be monitored and accessed until sent for printing to print engine 260. An operator may monitor hot folder 110 and take actions based on the content of the hot folder.

As disclosed above, hot folder 110 may include first file 112, second file 114, up to Nth file 116. The operator may access any one of these files prior to being printed. Hot folder 110 also includes print instructions 302. Each hot folder 110 has an associated set of print instructions 302 such that when a file is saved to the hot folder, print instructions 302 will be implemented when printing the print job.

Print instructions 302 serve as default print instructions for print jobs saved to hot folder 110. Values for print instructions 302 differ between different hot folders 110. For example, print instructions for one hot folder may specify a certain paper media to use while print instructions for another hot folder may specify a different paper media to use for printing operations. The operator may select which set of print instructions 302 to use for a print job and save it to the appropriate hot folder 110. Alternatively, a hot folder may not include any print instructions.

Print instructions 302 associated with hot folder 110 may include a plurality of instructions. For example, print quantity instruction 304 may be included. Print quantity instruction 304 may include a print quantity property and a print quantity value, such as 1000 copies. Print media instruction 306 may include a media property and a media value, such as A4, 70 GSM. Print media instruction 306 may specify a size and type of media to be used for printing operations. Finishing instruction 308 may include a finishing property and a finishing value, such as one for a booklet. Other types of print instructions may be implemented by hot folder 110.

Print instruction 302 are added to first file 112, second file 114, up to Nth file 116 for printing operations. Further, these files are retained in hot folder 110 until they complete processing within DFE 106. Additional job files also may be stored with the files in hot folder 110. For example, first print ticket 310 and first job cost data 312 may be stored with first file 112. Second print ticket 314 and second job cost data 316 may be stored with second file 114. The data and information for first print ticket 310 differs from second print ticket 312 while first job cost data 312 also differs from second job cost data 316. Thus, in additional to commonly shared print instructions 302, the files within hot folder 110 may include files or data specific to each print job.

Once a job finishes processing, then the associated file will be removed from hot folder 110. For example, if second file 114 finishes processing within DFE 106 before first file 112, then the second file is removed from hot folder 110 before the first file. Further, files within hot folder 110 may be modified while being retained. Thus, one or more edits 318 may be made to first file 112 while in hot folder 110. Edits 318 modify first file 112 to potentially change the associated print job 103. In some embodiments, a replacement file 320 may be provided to replace first file 112.

Modification of files within hot folder 110 will impact printing operations. The disclosed embodiments may monitor the status of the files within hot folder 110 and perform several options if a file is modified or replaced by replacement file 320. If the job has not started processing within DFE 106, then the disclosed embodiments may hold the job so that it does not process until edits 318 are completed or until replacement file 320 is finished copying into hot folder 110. Once these operations are completed, DFE 106 may resume processing the job using updated first file 112 or replacement file 320 as the PDL file.

If the job started processing but not printing, the disclosed embodiments would suspend the job. The disclosed embodiments, however, additionally would discard any rendered data for the job and restart processing from the start of the job using updated first file 112 or replacement file 320. Rendered data 322 generated from processing first file 112 would be deleted from DFE 106. New rendered data 322 would be generated after edits 318 are complete or replacement file 320 is copied to hot folder 110.

If the job is printing, then the disclosed embodiments may choose to abort the job as the operator will need to determine whether to reprint the job with updated first file 112 or replacement file 320. The job may be reprinted in its entirety using updated first file 112 or replacement file 320. Alternatively, it may be reprinted using the part of the job remaining to be printed. In other words, the part of the job already printed may not be modified so that there is no need to reprint it.

Hot folder 110 also may implement additional enhancements in order to protect the integrity of printing system 100 or DFE 106. These enhancements may be implemented for the purposes of enabling use of hot folder 110 as spool directory, or folder, 120. The enhancements also may be implemented in order to ensure the integrity of the printing operations in other cases that require files to reside in hot folder 110 for an extended period of time.

When files are received, the disclosed embodiments may adjust privileges 324 on the files in order to prevent modification of the files. For example, privileges 324 set forth for hot folder 110 may be applied to first file 112, second file 114, up to Nth file 116 to adjust the privileges of the files to correspond to privileges 324. Privileges 324 may adjust the privileges of the files to prevent any modification of the files once within hot folder 110. This feature will prevent the need to stop or restart processing of the files within hot folder 110.

Alternatively, privileges 324 may allow certain operators or others to access the files within hot folder 110. Privileges at the files may be set so that the original submitter or creator of the file may access and modify the file. Other privileges also may be set such as allowing an administrator access to the files. Most hot folders may capture the credentials of the operator submitting the files.

Figure 4:
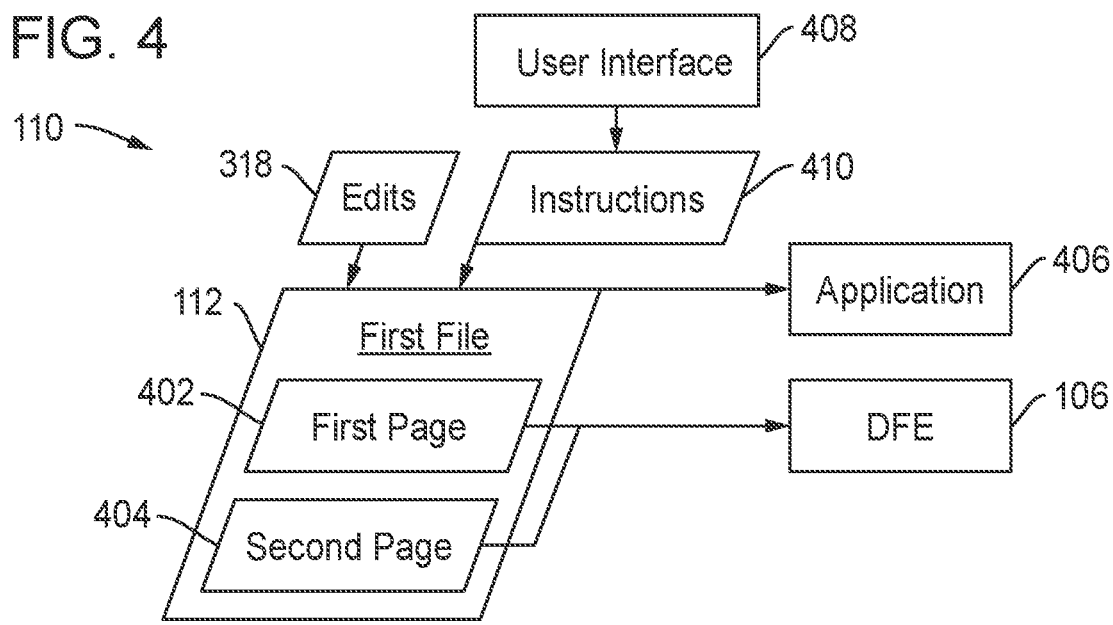
FIG. 4 illustrates a block diagram of a hot folder within an external file server for use during printing operations according to the disclosed embodiments.

FIG. 4 depicts a block diagram of hot folder 110 within external file server 118 for use during printing operations according to the disclosed embodiments. As disclosed above, printing system 100 may include an external file server 112 connected to DFE 106. Hot folder 110 may be located at external file server 118 in the situation where DFE 106 is limited. DFE 106 may be configured to use hot folder 110 even though it is located externally to printing device 104.

Hot folder 110 is shown with first file 112. Second file 114 up to Nth file 116 also be within hot folder 110. As hot folder 110 is located on external file server 118, a greater number of files may be stored in hot folder 110. Further, an additional number of hot folders 110 may be created and supported than within DFE 106. DFE 106 would track files within hot folder 110 on queue 122 with information from the files.

First file 112 may be transferred to DFE 106 when it is ready for processing or rendering. Thus, first file 112 is provided to DFE 106 from external file server 118. In some embodiments, DFE 106 may be limited in the amount of space to commit to holding files while processing. Thus, first file 112 may be split into individual pages in hot folder 110. The pages are transferred as at a limited number to DFE 106.

For example, first file 112 may be split into first page 402 and second page 404. First will be kept within hot folder 110 while first page 402 is processed. When space becomes available, second page 404 is sent to DFE 106 for processing. If second page 404 is the last page for printing within first file 112, then first file 112 is removed from hot folder 110. In some embodiments, pages may be deleted from hot folder 110 when they are sent to DFE 106.

The disclosed embodiments may provide the ability to enable sophisticated job manipulation or processing that may be available in server DFEs because spool directory 120 remains accessible to third party clients. For example, hot folder 110 on external file server 118 or a server DFE may provide the operator the ability to open PDFs in an application 406 for preflight or editing. Indeed, first file 112 may receive edits 318, as disclosed above. This functionality is not normally available in an embedded controller for DFE 106 because such functionality requires a local copy of the third party preflight or editing software. Using external file server 118 provides this functionality. Because spool directory 120, as hot folder 110, remains accessible by application 406, first file 112 may be opened by the application.

Further, the disclosed embodiments may implement the protection functionality disclosed above with the use of privileges 324. To allow access by application 406, these protections may need to be lifted or removed. User interface 408 may have access to hot folder 110 on external file server 118 to provide an instruction 410 that will loosen integrity protection and open first file 112 in application 406.

Additional functionality may include integrations with third party production printing products that support hot folder 110. For example, DFE 106 may be an embedded controller that moves first file 112 from hot folder 110 in memory 108 to a hot folder of a program or application 406 that may perform sophisticated imposition not available in an embedded controller. This feature may be enabled via a trigger using instruction 410 from user interface 408 within printing system 100. When the operator selects one of these options, the disclosed embodiments would move first file 112 to the third party client and replace the spool file with the output from the external process.

Figure 5:
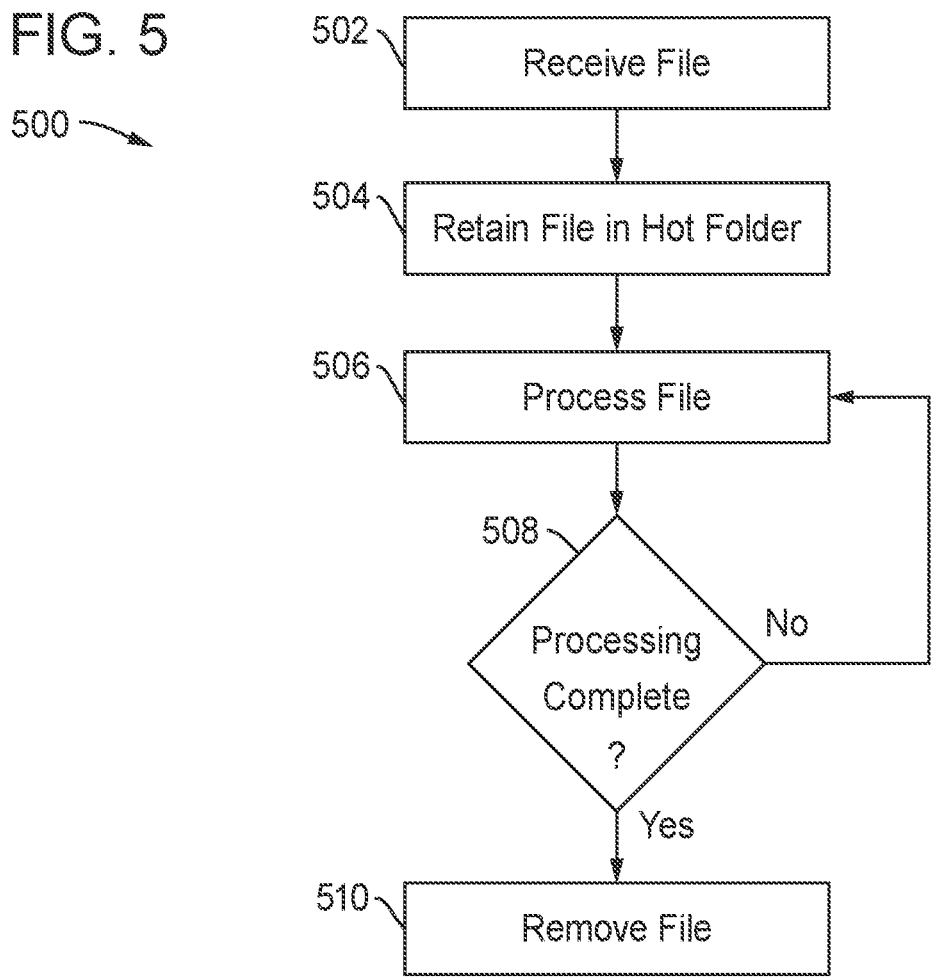
FIG. 5 illustrates a flowchart for managing files in the hot folder according to the disclosed embodiments.

FIG. 5 depicts a flowchart 500 for managing files in hot folder 110 according to the disclosed embodiments. Flowchart 500 may refer to FIGS. 1A-4 for illustrative purposes. Flowchart 500, however, is not limited to the embodiments disclosed by FIGS. 1A-4.

Step 502 executes by receiving a file at hot folder 110 associated with printing device 104. As disclosed above, hot folder 110 may be stored within memory 108 or external file server 118. The file also corresponds to a print job to be printed at printing device 104. Using the above examples, print job 103 is received within printing system 100 and first file 112 corresponds thereto. First file 112 is placed within hot folder 110. When first file 112 goes to print on printing device 104, print instructions 302 are applied for printing operations. Further, any privileges 324 may be applied to first file 112 to changes its privileges for access.

Step 504 executes by retaining first file 112 within hot folder 110. First file 112 remains within hot folder 112 until it is deleted, as disclosed below. First file 112 may be accessed by an operator, as allowed by privileges 324, and an application 406, if certain conditions are met. Step 506 executes by processing first file 112 within DFE 106 of printing device 104. First file 112 may be rendered within DFE 106.

Step 508 executes by determining whether processing is complete for first file 112 within DFE 106. For example, processing may be complete when a rendered file is ready to be sent to print engine 260 for printing. If step 508 is no, then flowchart 500 returns to step 506 to continue processing first file 112. If step 508 is yes, then first file 112 is removed from hot folder 110. The rendered data for first file 112 is sent to print engine 260.

Figure 6:
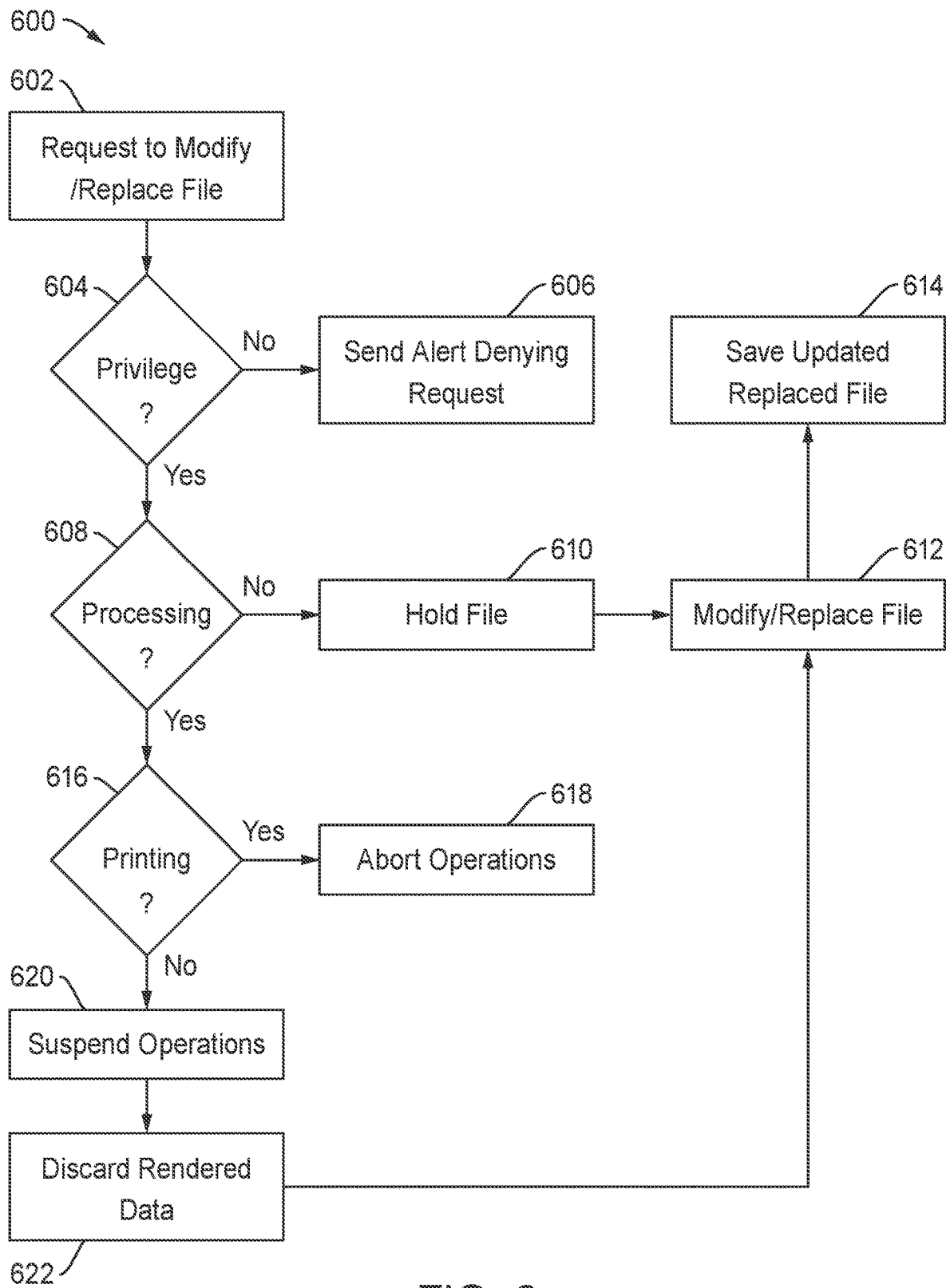
FIG. 6 illustrates a flowchart for modifying a file within the hot folder according to the disclosed embodiments.

FIG. 6 depicts a flowchart 600 for modifying or replacing a file within hot folder 110 according to the disclosed embodiments. Flowchart 600 may refer to FIGS. 1A-5 for illustrative purposes. Flowchart 600, however, is not limited to the embodiments disclosed by FIGS. 1A-5.

Step 602 executes by requesting to modify or replace a file within hot folder 110. Using the above examples, first file 112 may be the file requested to be modified. First file 112 may correspond to print job 103 received for printing at printing device 104. Step 604 executes by determining whether the requestor has privilege authorization to modify first file 112. Privileges 324 may be set for hot folder 110 to deny unauthorized access to files within the hot folder. If step 604 is no, then step 606 executes by sending an alert denying the request to modify first file 112. No further action may be taken.

If step 604 is yes, then step 608 executes by determining whether DFE 106 is processing first file 112 for printing operations. In other words, rendering of first file 112 may have begun such that rendered data is being produced. If step 608 is no, then it is acceptable to modify first file 112 as no processing is occurring. Step 610 executes holding first file 112 from being provided to DFE 106 for processing. First file 112 is retained in hot folder 110.

Step 612 executes by modifying or replacing first file 112. Edits 318 may be received through an application to modify first file 112. Alternatively, replacement file 320 may be received to replace first file 112. Step 614 executes by saving updated first file 112 or replacement file 320 within hot folder 110. At this point, the file may remain in hot folder 110 until processing starts. If hot folder 110 is located at external file server 118, then the file may be provided to DFE 106 for processing.

If step 608 is yes, then stopping the processing of first file 112 will have implications on printing operations. Step 616 executes by determining whether printing device 104 is printing first file 112. Printing of first file 112 indicates that the file is already rendered. If step 616 is yes, then step 618 executes by aborting processing or printing operations for first file 112, or of print job 103. The operator will need to determine whether to reprint the job in its entirety or whether to reprint just the remaining part of the job with the edits or replacement file.

If step 616 is no, then first file 112 is still undergoing processing within DFE 106. Modifications or replacement of first file 112 may still be accomplished. Step 620 executes by discarding the rendered data already generated for first file 112. Flowchart 600 then proceeds to steps 612 and 614 disclosed above to modify or replace first file 112 then restart processing with the modified or replaced file.

Once the replaced or modified file is providing to print engine 260, the associated file is removed from hot folder 110. These features allow for improved printing operations management using hot folders either at the DFE or in the external file server.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing printing operations, the method comprising:
   receiving, at a hot folder associated with a printing device, a file for a print job to be printed at the printing device;
   applying a privilege to the file from the hot folder, wherein the privilege is to restrict access to the file or allow certain operators to modify the file;
   processing the print job at a digital front end (DFE) of the printing device;
   retaining the file for the print job in the hot folder during the processing;
   determining that the processing is complete; and
   removing the file for the print job from the hot folder, wherein the privilege can be lifted or removed by applying another privilege to the file.

2. The method of claim 1, wherein processing is complete when the rendered file is provided to a print engine of the printing device.

3. The method of claim 1, further comprising opening the file of the print job in the hot folder.

4. The method of claim 3, further comprising interacting with the file of the print job and saving it back to the hot folder.

5. The method of claim 1, further comprising storing an additional job file associated with the print job in the hot folder.

6. The method of claim 1, further comprising storing the file for the print job in the hot folder, wherein the hot folder is located at an external file server accessible by the DFE.

7. The method of claim 6, further comprising transferring the file for the print job to the DFE for processing from the hot folder.

8. The method of claim 6, further comprising opening the file for the print job in the hot folder using a software application.

9. A method for performing printing operations, the method comprising:
   receiving, at a hot folder associated with a printing device, a file for a print job to be printed at the printing device;
   accessing the file for the print job stored in the hot folder;
   determining whether the file for the print job is available by determining whether a privilege for the file exists within the hot folder, wherein the privilege is to restrict access to the file or allow certain operators to modify the file;
   opening the file for the print job stored in the hot folder;
   modifying the file for the print job using an application; and
   saving the modified file for the print job within the hot folder when the application is closed.

10. The method of claim 9, further comprising adjusting the privilege for the file for the print job if the privilege for the file exists and modifying the file is permitted.

11. The method of claim 9, wherein the privilege allows a submitter of the print job to access the file of the print job within the hot folder.

12. The method of claim 9, wherein determining whether the file for the print job is available includes determining a status of the print job within a digital front end (DFE) of the printing device.

13. The method of claim 12, further comprising holding the print job within the hot folder based on the status until the modified file is saved within the hot folder based on the status.

14. The method of claim 12, further comprising suspending processing of the print job within the DFE and discarding any rendered data for the print job based on the status if the file has been rendered.

15. The method of claim 14, further comprising restarting processing of the print job when the modified file is saved within the hot folder.

16. The method of claim 12, further comprising aborting the print job at the printing device based on the status.

17. A printing system comprising:
   a printing device having a digital front end (DFE); and
   a storage device accessible by the DFE, wherein the storage device includes a processor and a memory connected to the processor, wherein the memory stores instructions that, when executed on the processor, configures the storage device to
   receive, at a hot folder associated with the printing device, a file for a print job to be printed at the printing device;
   applying a privilege to the file from the hot folder, wherein the privilege is to restrict access to the file or allow certain operators to modify the file;
   process the print job at a digital front end (DFE) of the printing device;
   retain the file for the print job in the hot folder during the processing;
   removing the file for the print job from the hot folder, applying another privilege to the file to lift or remove the privilege;

determine that the processing is complete; and
remove the file for the print job from the hot folder.

18. The printing system of claim 17, wherein the storage device is external to the printing device.

* * * * *